United States Patent
Tsuji

(10) Patent No.: US 9,440,561 B2
(45) Date of Patent: Sep. 13, 2016

(54) RECLINER

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventor: Eiichiro Tsuji, Kariya (JP)

(73) Assignees: TOYOTA BOSHOKU KABUSHIKI KAISHA, Aichi-Ken (JP); AISIN SEIKO KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/818,523

(22) Filed: Aug. 5, 2015

(65) Prior Publication Data

US 2016/0059743 A1 Mar. 3, 2016

(30) Foreign Application Priority Data

Aug. 28, 2014 (JP) ................................. 2014-174356

(51) Int. Cl.
*B60N 2/225* (2006.01)

(52) U.S. Cl.
CPC .................................. *B60N 2/2252* (2013.01)

(58) Field of Classification Search
CPC ...... B60N 2/22; B60N 2/2213; B60N 2/225; B60N 2/2252
See application file for complete search history.

(56) References Cited

U.S. PATENT DOCUMENTS

| | | | | |
|---|---|---|---|---|
| 6,010,191 A * | 1/2000 | Calinaud | ............. | B60N 2/2356 297/365 |
| 6,572,196 B1 * | 6/2003 | Thieme | ................ | B21D 39/032 297/362 |
| 7,950,742 B2 * | 5/2011 | Endo | ...................... | B60N 2/682 297/354.12 |
| 8,282,168 B2 * | 10/2012 | Kienke | .................. | B23K 26/20 297/367 R |
| 8,851,572 B2 * | 10/2014 | Schuhmacher | ...... | B60N 2/4435 297/362 |
| 2010/0026072 A1 * | 2/2010 | Uramichi | ............... | B60N 2/682 297/367 R |
| 2012/0057926 A1 * | 3/2012 | Fassebender | .......... | B60N 2/225 403/66 |
| 2012/0306254 A1 * | 12/2012 | Ishihara | ............... | B60N 2/2252 297/354.1 |
| 2015/0091354 A1 * | 4/2015 | Enokijima | ............... | B60N 2/20 297/354.12 |

FOREIGN PATENT DOCUMENTS

| | | |
|---|---|---|
| JP | 2009-254438 | 11/2009 |
| JP | 2009-279184 | 12/2009 |
| JP | 2011-116303 | 6/2011 |
| JP | 2012-46091 | 3/2012 |

* cited by examiner

*Primary Examiner* — Philip Gabler

(74) *Attorney, Agent, or Firm* — Greenblum & Bernstein, P.L.C.

(57) ABSTRACT

A recliner includes a first and second connecting members assembled together, and a ring member that holds the assembled connecting members. A dowel fitted in a fitting portion of a frame is formed in a region of an axially outer surface of the second connecting member. A radially outer portion of the second connecting member has an expanded portion expanding radially outward in a region at a circumferential position where the dowel is formed, and a recessed portion recessed radially inward in a region at a circumferential position where the dowel is not formed. A joint portion of the ring member is placed on an outer circumferential surface of the recessed portion, and the expanded portion is placed, from an inside in the axial direction, against a weld zone of the frame in which the dowel is welded.

3 Claims, 10 Drawing Sheets

RECLINER

INCORPORATION BY REFERENCE

The disclosure of Japanese Patent Application No. 2014-174356 filed on Aug. 28, 2014 including the specification, drawings and abstract is incorporated herein by reference in its entirety.

BACKGROUND OF THE INVENTION

1. Field of the Invention

The invention relates to a recliner. More specifically, the invention relates to a recliner that connects a seat back to a base on a floor such that the backrest angle of the seat back is adjustable.

2. Description of Related Art

In a vehicle seat of the related art, a seat back is connected to a seat cushion via a recliner such that the backrest angle is adjustable (see Japanese Patent Application Publication No. 2009-279184 (JP 2009-279184 A)). In the recliner, disk-shaped internal gear and external gear are assembled together such that they rotate relative to each other while changing a mesh position where the internal gear and the external gear mesh with each other. By use of a coupling mechanism mounted between the internal gear and the external gear, the internal gear and external gear are pressed against each other in a radial direction so that their relative rotation is inhibited, or pushed and rotated in such a direction as to change the mesh position.

The external gear and the internal gear are assembled together, with a cylindrical retaining member mounted across their radially outer portions, such that the gears are inhibited from being disengaged from each other or falling off in the axial direction. Also, the external gear and the internal gear are firmly and integrally joined to a side frame of the seat back and a side frame of the seat cushion, by means of dowels formed on axially outer surfaces of the gears to protrude from these surfaces. Namely, each of the dowels is fitted in and welded to a corresponding one of dowel holes formed in the side frame of the seat back or the side frame of the seat cushion.

However, according to the related art, the dowels are formed in the vicinity of outer peripheral portions of the external gear and the internal gear. Therefore, when each of the dowels is fitted in and welded to the corresponding dowel hole of the side frame, a backing portion (a radially outer portion of the external gear or internal gear) to be placed against the rear side of the side frame is insufficient, and the side frame may burn through during welding if the thickness of the side frame is small.

SUMMARY OF THE INVENTION

This invention provides a recliner in which a sufficiently large backing portion is provided for curbing burn-through of a frame when a dowel is fitted in a fitting portion of the frame and welded to the frame, even if the dowel is located at a position close to an outer peripheral portion of a connecting member.

An aspect of the invention relates to a recliner that connects a seat back to a base on a floor such that a backrest angle of the seat back is adjustable. The recliner includes: two disk-shaped connecting members assembled in an axial direction such that the two connecting members are rotatable relative to each other, the two connecting members including a first connecting member and a second connecting member; a rotation inhibiting mechanism that is provided between the two connecting members and inhibits relative rotation of the two connecting members; and a ring member that is mounted across radially outer portions of the two connecting members and holds the two connecting members assembled in the axial direction. The ring member has a retaining portion placed against the radially outer portion of the first connecting member, from an outside in the axial direction, and a joint portion joined to the radially outer portion of the second connecting member. A dowel fitted in a fitting portion of a frame that constitutes one of the seat back and the base is formed in a region of an axially outer surface of the second connecting member, the dowel protruding from the axially outer surface. The radially outer portion of the second connecting member has an expanded portion that expands radially outward beyond the dowel in a region at a circumferential position where the dowel is formed, and has a recessed portion that is recessed radially inward relative to the expanded portion in a region at a circumferential position where the dowel is not formed. The recessed portion receives the joint portion of the ring member in the axial direction, and the joint portion of the ring member is placed on an outer circumferential surface of the recessed portion. The expanded portion expands radially outward beyond the joint portion of the ring member placed on the outer circumferential surface of the recessed portion, and is placed, from an inside in the axial direction, against a weld zone of the frame in which the dowel fitted in the fitting portion is welded from the outside in the axial direction.

The above-indicated radially outer portion of the second connecting member to which the joint portion of the ring member is joined may include an outer circumferential surface of the second connecting member, and one of side faces of the second connecting member which face in the axial direction.

With the recliner configured as described above, the expanded portion that expands radially outward beyond the dowel is placed, from the back side, against the weld zone of the frame in which the dowel of the second connecting member is welded. Thus, burn-through of the frame during welding of the dowel can be curbed. Since the expanded portion expands radially outward beyond the joint portion of the ring member placed, from the radially outer side, on the recessed portion of the second connecting member, the backing portion that serves to curb burn-through of the frame can be made sufficiently large.

The first connecting member may have an internal gear formed by half-blanking on an axially outer side of a central portion of the first connecting member, and the second connecting member may have an external gear formed by half-blanking on an axially inner side of a central portion of the second connecting member. The external gear may mesh with the internal gear and rotates relative to the internal gear while changing an mesh position where the external gear meshes with the internal gear. The dowel may be formed in the region located on a radially outer side of the external gear.

With the above configuration, the second connecting member can be joined to the frame with high strength. Namely, the second connecting member formed with the external gear has a region that protrudes axially outward on the radially outer side of the external gear. With the dowel formed in this region, the amount of protrusion of the dowel in the axial direction is reduced, and the dowel is located in a region close to the outer periphery of the second connecting member. Thus, the second connecting member can be constructed with high structural strength. In this arrangement, the backing portion placed against the weld zone of the frame is provided, so burn-through of the weld zone of the frame can be more appropriately curbed.

The expanded portion may determine a mounting position of the ring member when the ring member is butted against the expanded portion in the axial direction.

With the above configuration, the position of the ring member is determined when the ring member is butted against the expanded portion in the axial direction. This makes it unnecessary to provide a separate positioning structure, and simplifies the configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings.

Figure 1:
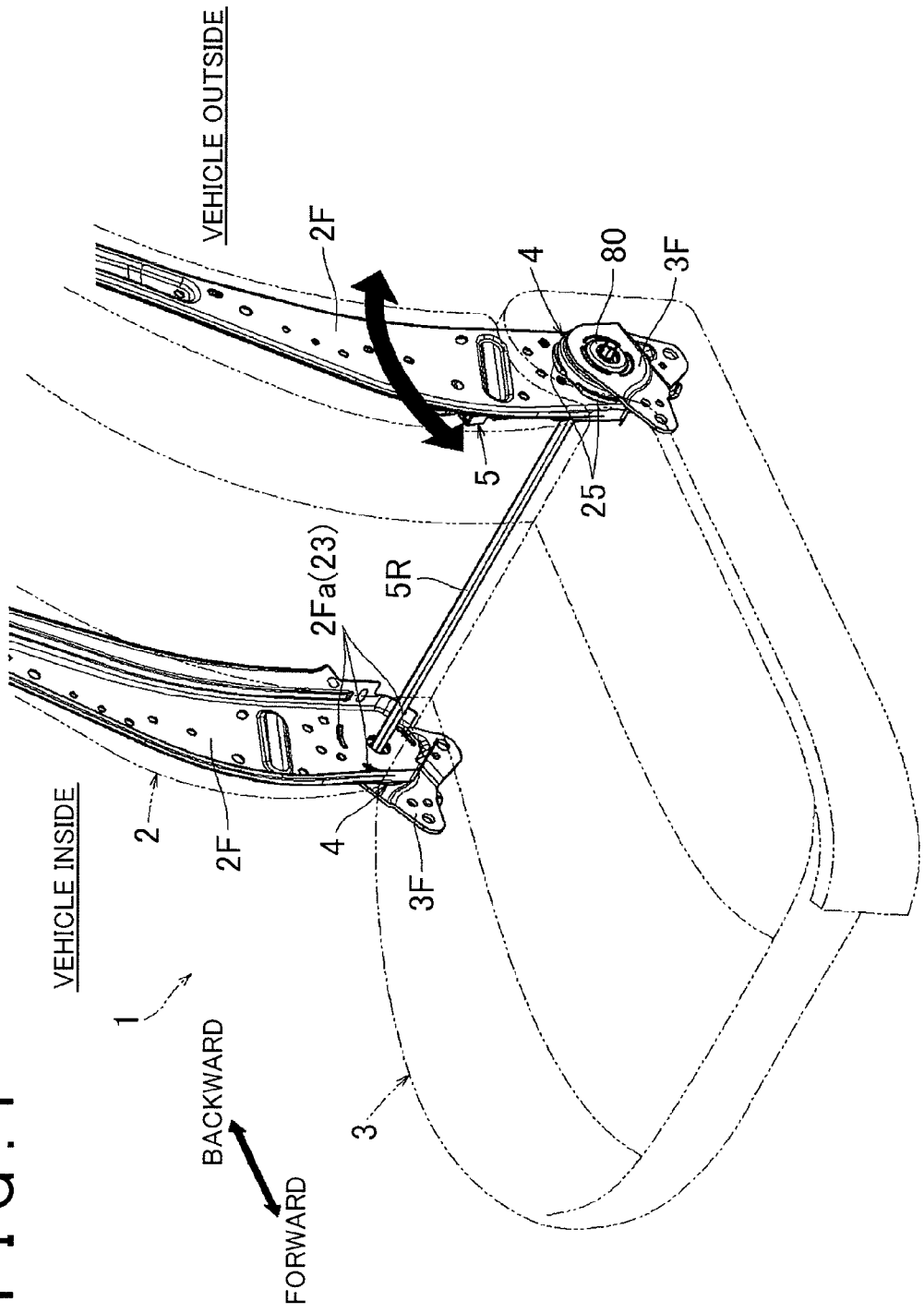
FIG. 1 is a schematic perspective view of a seat for a vehicle to which a recliner according to one embodiment of the invention is applied.
Figure 2:
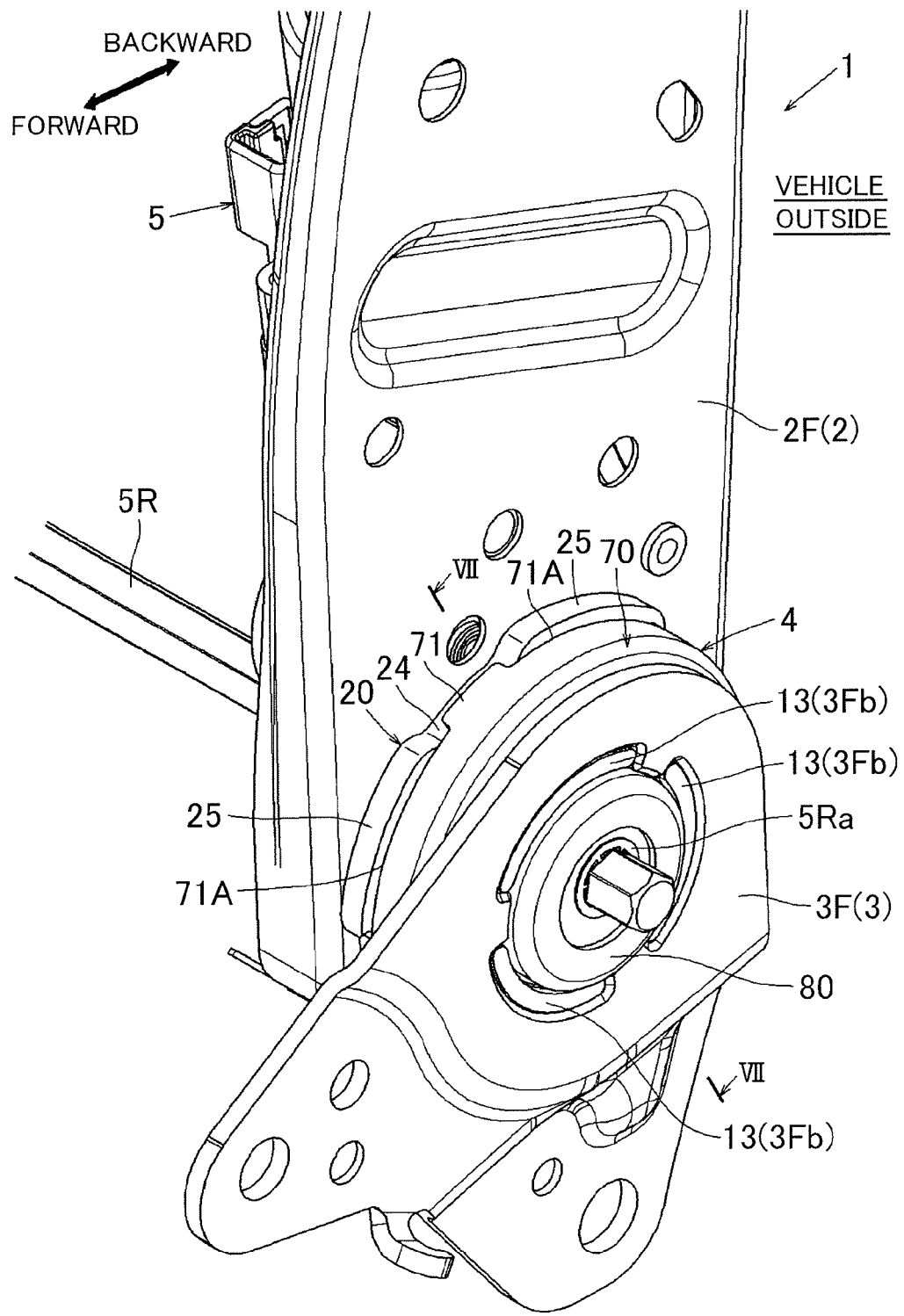
FIG. 2 is an enlarged, perspective view of a connecting portion of a seat back and a seat cushion.
Figure 3:
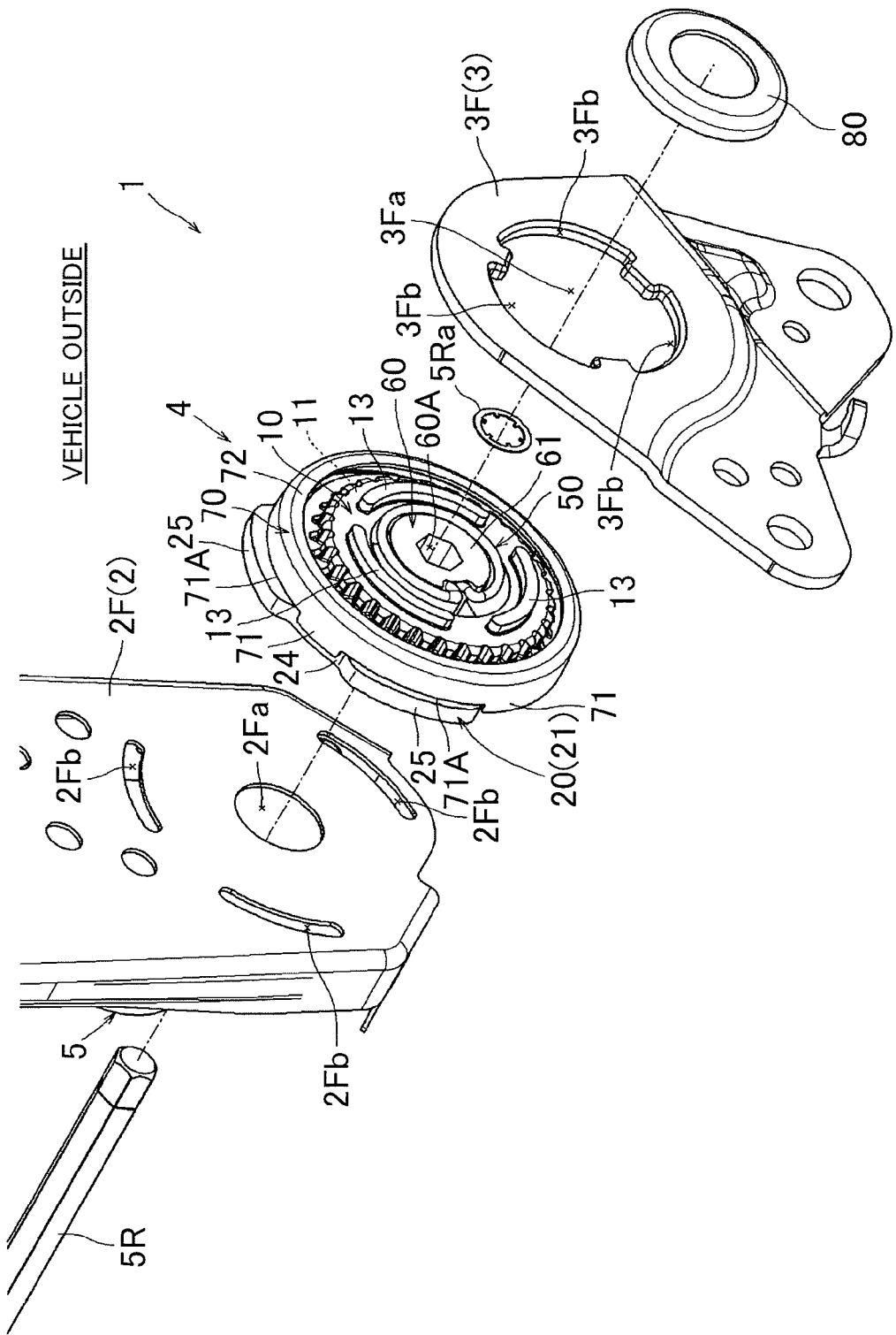
FIG. 3 is an exploded perspective view of the connecting portion.
Figure 4:
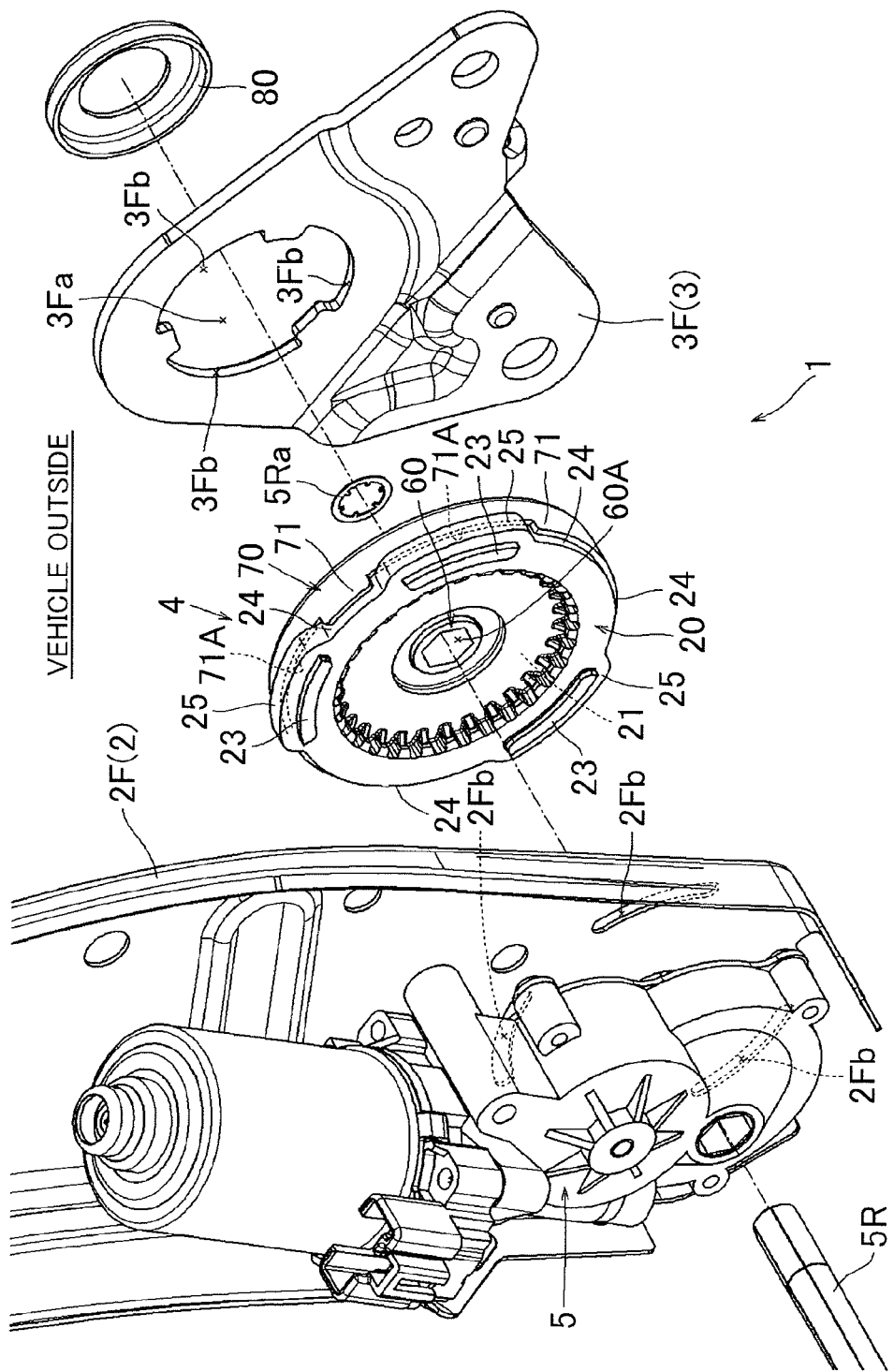
FIG. 4 is an exploded perspective view of the connecting portion as viewed in a different direction.

Initially, the configuration of a recliner 4 as one embodiment of the invention will be described with reference to FIG. 1 through FIG. 10. As shown in FIG. 1, the recliners 4 of this embodiment are used for a seat 1 of an automobile, and serves as pivotal devices (coupling devices) that connect a seat back 2 serving as a backrest for a seated occupant, with a seat cushion 3 serving as a seating portion, such that the backrest angle is adjustable. The recliners 4 are able to inhibit rotation of the seat back 2 relative to the seat cushion 3. The seat cushion 3 is one example of a base. Each of the recliners 4 is provided between a lower end portion of each of side frames 2F that form the frameworks of opposite side (right and left) portions of the seat back 2, and a rear end portion of each of side frames 3F that form the frameworks of opposite side (right and left) portions of the seat cushion 3, so as to connect these portions with each other. More specifically, as shown in FIG. 2 through FIG. 4, the side frames 2F on the right and left sides of the seat back 2 are located inside the side frames 3F on the right and left sides of the seat cushion 3, respectively, and the recliners 4 are interposed between the side frames 2F on the right and left sides of the seat back 2 and the side frames 3F on the right and left sides of the seat cushion 3.

Each side frame 3F of the seat cushion 3 has a larger thickness than each side frame 2F of the seat back 2. The side frame 3F of the seat cushion 3 strongly receives a load of the seated occupant who leans back against the seat back 2, as a bending moment, via the recliner 4 on each side which supports the seat back 3; therefore, the thickness of the side frame 3F is made large to ensure high structural strength. Each side frame 2F of the seat back 2 is formed from a plate member that is thinner than each side frame 3F of the seat cushion 3, for the sake of weight saving.

Each of the recliners 4, which is electrically operable, is normally held in a condition (rotation-inhibited condition) in which the backrest angle of the seat back 2 is fixed. When a power-operable switch (not shown) provided on a side portion of the seat cushion 3 on the outer side of the vehicle is operated, the recliners 4 are rotationally operated at the same time so as to vary the backrest angle of the seat back 2 in the longitudinal direction of the automobile. When the power-operable switch stops being operated, the rotational operation of the recliners 4 is stopped at the same time.

More specifically, an operating member 60 for rotationally operating each recliner 4 is incorporated in a central portion of the recliner 4. The operating members 60 of the respective recliners 4 are connected integrally to each other via a rod 5R, so that the recliners 4 are rotationally operated at the same time so as to vary the backrest angle of the seat back 2 in the longitudinal direction when the rod 5R is rotated about its axis. The rod 5R is connected to a drive unit 5 fixed to an inner surface of the side frame 2F of the seat back 2 on the outer side of the vehicle so as to transmit power. The rod 5R is rotated about its axis in the forward and reverse directions or inhibited from rotating, under rotational force or braking force transmitted from the drive unit 5.

Figure 5:
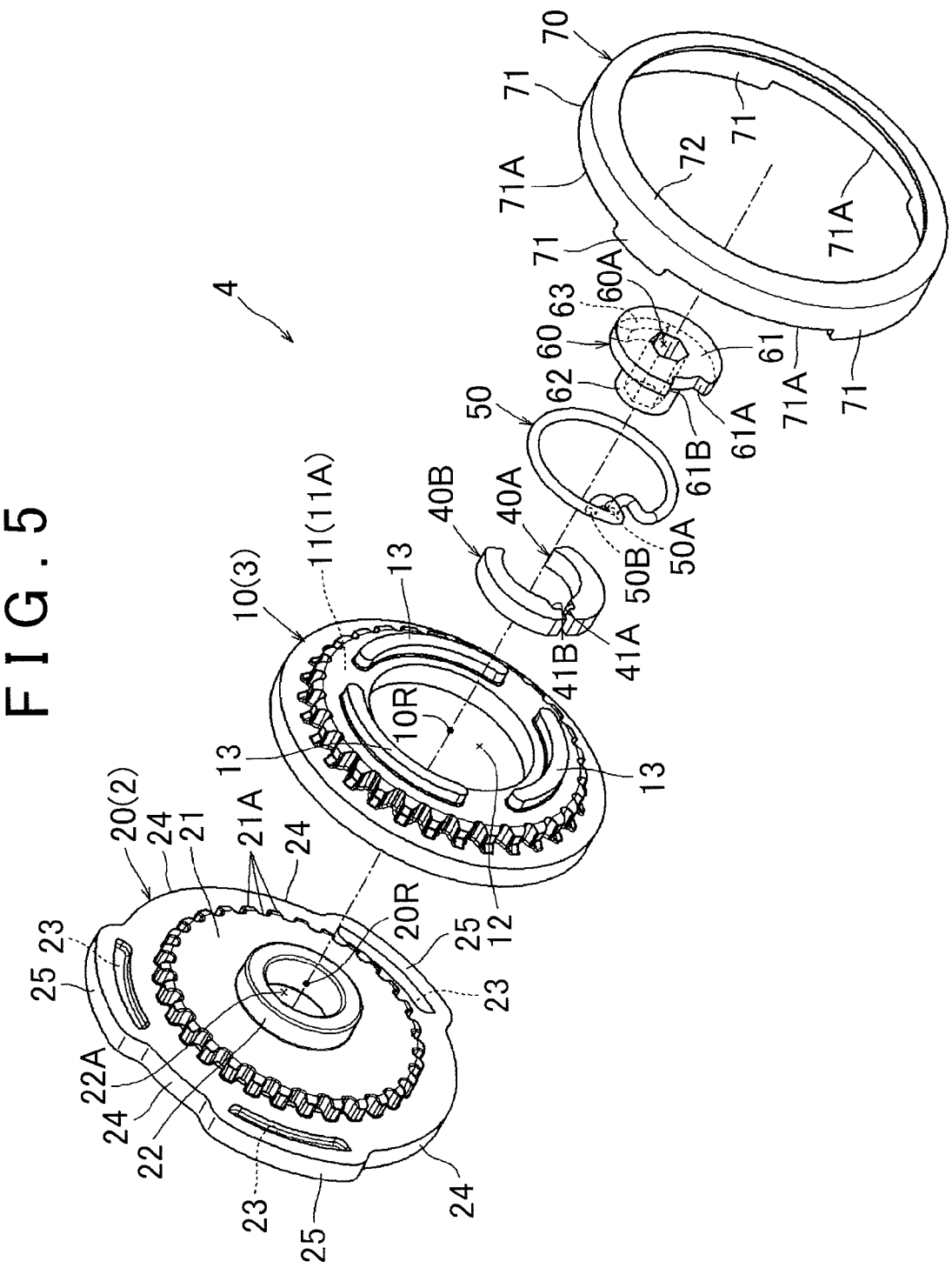
FIG. 5 is an exploded perspective view of the recliner.
Figure 6:
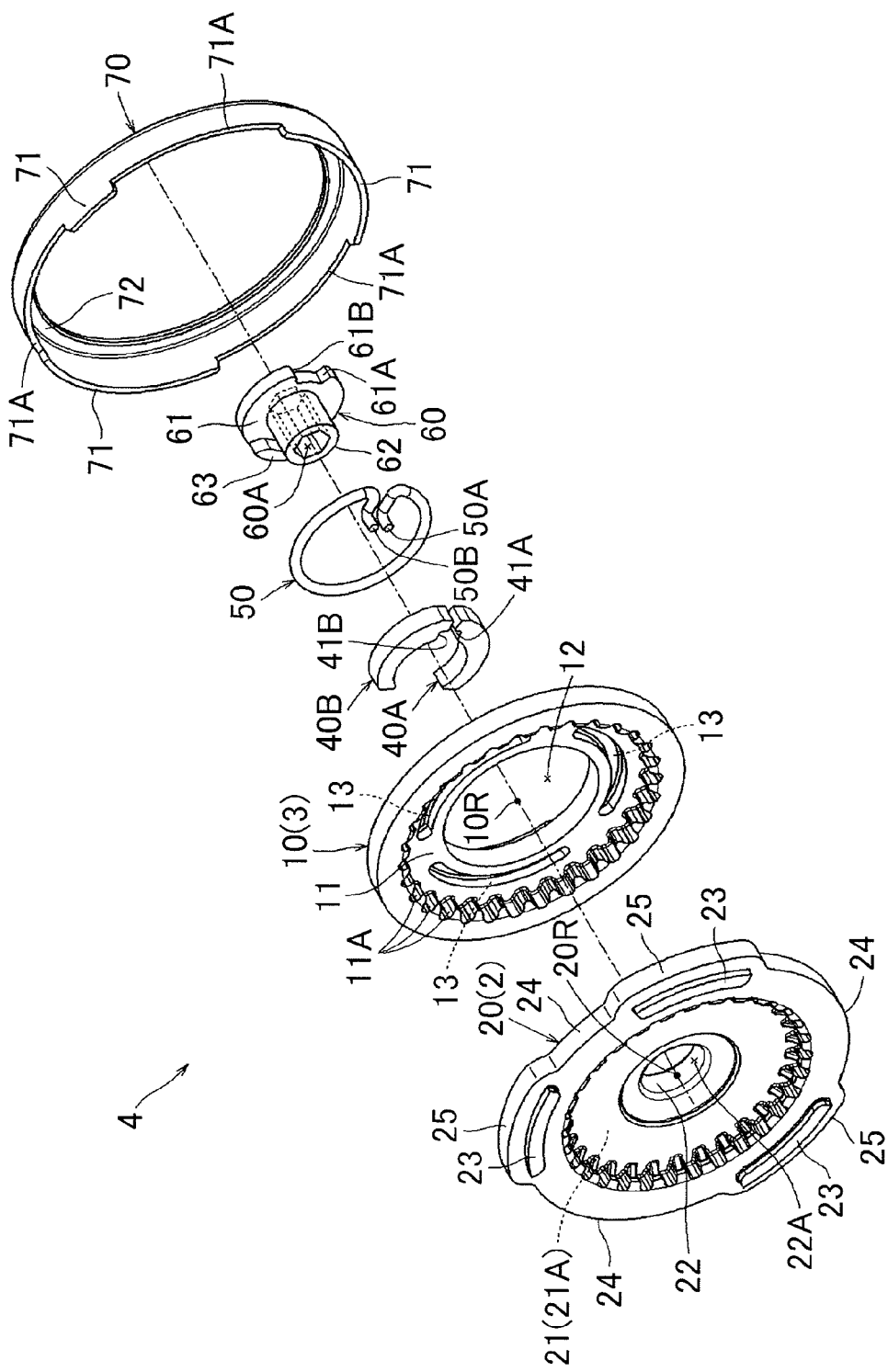
FIG. 6 is an exploded perspective view of the recliner as viewed in a different direction.

In the following, the specific configuration of each of the recliners 4 as described above will be described in more detail. The recliners 4 are disposed symmetrically with each other with respect to a centerline of the seat, but have substantially the same configuration. Accordingly, as a typical example, the configuration of the recliner 4 located on the vehicle outer side as shown in FIG. 2 through FIG. 4 will be described. As shown in FIG. 5 and FIG. 6, the recliner 4 has disk-shaped cushion-side connecting member 10 and back-side connecting member 20 assembled with each other in the axial direction, a pair of wedge members 40A, 40B mounted between the connecting members 10, 20, and a lock spring 50 mounted across the pair of wedge members 40A, 40B. The recliner 4 also has the operating member 60 pivotally mounted in a center portion of the back-side connecting member 20, and a ring member 70 formed in a cylindrical shape with a bottom, which is mounted across both the connecting members 10, 20.

The cushion-side and back-side connecting members 10, 20, wedge members 40A, 40B, and the operating member 60 are formed from hard steel plates subjected to hardening. In this embodiment, the cushion-side connecting member 10 serves as a first connecting member, and the back-side connecting member 20 serves as a second connecting member, while an operating mechanism consisting of the pair of wedge members 40, 40B and the lock spring 50 serves as a rotation inhibiting mechanism".

The cushion-side connecting member 10 is formed in a generally disk shape. In an outer peripheral portion of the cushion-side connecting member 10, an internal gear 11 that protrudes axially outward in a cylindrical shape is formed by half-blanking in the thickness direction. Internal teeth 11A are formed in the circumferential direction, on the inner circumferential surface of the internal gear 11. External teeth 21A of an external gear 21 are formed to protrude on a central portion of the back-side connecting member 20 which will be described later. The external teeth 21A are pressed from the radially inner side against the internal teeth 11A of the internal gear 11 to mesh with the external teeth 21A. The internal teeth 11A are formed over the entire circumferential region on the inner circumferential surface of the internal gear 11.

A round hole 12 that extends in the shape of a precise circle in the thickness direction is formed in a central portion of the cushion-side connecting member 10. In the round hole 12, a cylindrical portion 22 formed to protrude on a central portion of the back-side connecting member 20, and the pair of wedge members 40A, 40B are mounted. When the wedge members 40A, 40B, located between the cylindrical portion 22 of the back-side connecting member 20 mounted inside the round hole 12 and the inner circumferential surface of the round hole 12, are pressed in circumferentially opposite directions, the cushion-side connecting member 10 inhibits rotation of the back-side connecting member 20 relative to the cushion-side connecting member 10. When the wedge members 40A, 40B are pushed to rotate to one of the opposite sides, on the other hand, the back-side connecting member 20 is rotated relative to the cushion-side connecting member 10. These movements will be specifically described in detail later.

Figure 7:
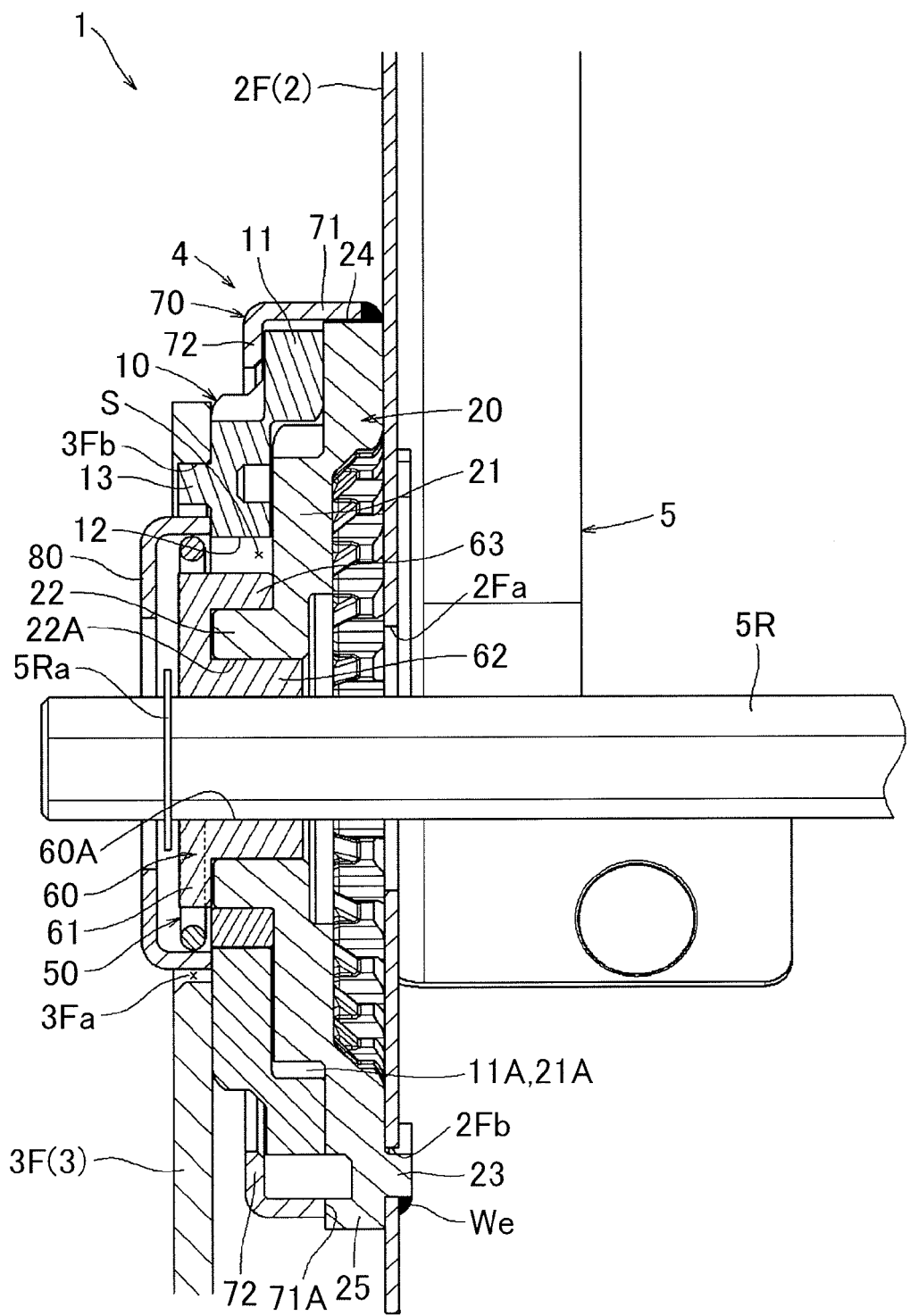
FIG. 7 is a cross-sectional view taken along line VII-VII in FIG. 2.

As shown in FIG. 5, three dowels 13 that protrude in an arcuately curved shape are formed on an axially outer surface of the cushion-side connecting member 10, at positions on the same circumference, such that the dowels 13 are arranged in the circumferential directions. The dowels 13 are formed by half-blanking a central wall portion of the cushion-side connecting member 10 in the thickness direction (axial direction). As shown in FIG. 3 and FIG. 7, when the axially outer surface of the cushion-side connecting member 10 is placed against and joined to the inner surface of the side frame 3F of the seat cushion 3, these dowels 13 are fitted in and integrally joined by welding to three dowel holes 3Fb formed in the side frame 3F. The side frame 3F of the seat cushion 3 is formed with a fitting hole 3Fa in the shape of a large precise hole that extends through the side frame 3F, across the three dowel holes 3Fb (see FIG. 3).

As shown in FIG. 5 and FIG. 6, the back-side connecting member 20 is formed in a generally disk shape having a larger outside diameter than the cushion-side connecting member 10. In the central portion of the back-side connecting member 20, the external gear 21 is formed by half-blanking in the thickness direction. The external gear 21 protrudes in a cylindrical shape toward the axially inner side, namely, in a direction in which the back-side connecting member 20 is mounted to the cushion-side connecting member 10. On the outer circumferential surface of the external gear 21, the external teeth 21A are formed such that the external teeth 21A are arranged in the circumferential direction. The external teeth 21A can mesh with the internal teeth 11A formed on the inner circumferential surface of the internal gear 11 of the cushion-side connecting member 10. The external teeth 21A is formed over the entire circumferential region on the outer circumferential surface of the external gear 21.

The outside diameter of the external gear 21 is smaller than that of the internal gear 11 of the cushion-side connecting member 10, and the number of teeth of the external gear 21 is smaller by one than that of the internal gear 11. More specifically, in the external gear 21, the number of the external teeth 21A is 33, and, in the internal gear 11, the number of the internal teeth 11A is 34. The back-side connecting member 20 is assembled with the cushion-side connecting member 10 such that the teeth of the external and internal gears mesh in radial directions with each other.

The cylindrical portion 22 is formed by burring in the central portion of the back-side connecting member 20. The cylindrical portion 22 protrudes in a cylindrical shape axially inward, namely, in a direction in which the back-side connecting member 20 is mounted to the cushion-side connecting member 10. The cylindrical portion 22 has an outside diameter that is smaller than that of the round hole 12 formed in the central portion of the cushion-side connecting member 10. In the cylinder of the cylindrical portion 22, a through-hole 22A that extends through the back-side connecting member 20 in the thickness direction is formed in the shape of a precise hole. When the external gear 21 of the back-side connecting member 20 is mounted in the axial direction to the internal gear 11 of the cushion-side connecting member 10 for meshing (engagement), the cylindrical portion 22 is inserted through the round hole 12 of the cushion-side connecting member 10, and an annular clearance S is formed between the cylindrical portion 22 and the inner circumferential surface of the round hole 12 (see FIG. 7 and FIG. 8).

Figure 8:
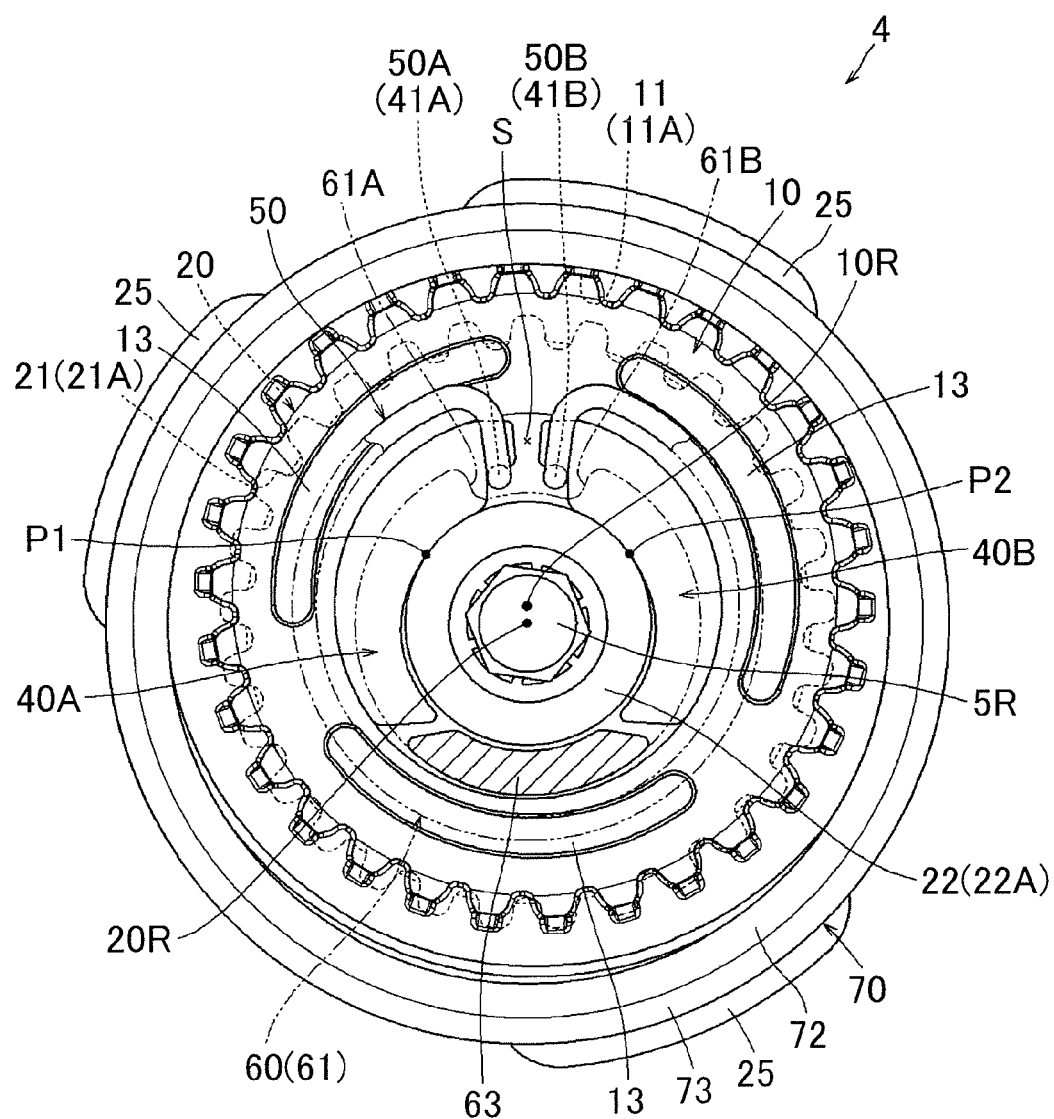
FIG. 8 is a side view showing a condition in which the recliner is inhibited from rotating.

As shown in FIG. 8, the external gear 21 of the back-side connecting member 20 is pressed in a particular radial direction (downward in FIG. 8) against the internal gear 11 of the cushion-side connecting member 10, and the connecting members 20, 10 are assembled together in a condition where their central positions 20R, 10R are eccentric to each other. In this condition, the annular clearance S is shaped such that its radial size is smaller in a circumferential region in which the external gear 21 and the internal gear 11 mesh with each other, and its radial size is larger on the side opposite to the circumferential region with respect to the axis. The pair of wedge members 40A, 40B are placed in the annular clearance S, and the lock spring 50 in the form of an open ring is engaged between the wedge members 40A, 40B. The lock spring 50 applies bias force to the wedge members 40A, 40B in such a direction as to urge these members 40A, 40B away from each other in the circumferential direction.

With the above arrangement, the pair of wedge members 40A, 40B receive bias force so as to be pressed toward the opposite sides in the circumferential direction from the region having a larger radial clearance toward the region having a smaller radial clearance, within the annular clearance S. With the pressing force thus applied, the back-side connecting member 20 is constantly placed in a condition where it is pressed against the cushion-side connecting member 10 in a particular radial direction (downward in FIG. 8) (pressing points P1, P2). In this state, the gears 21, 11 mesh with each other in the particular radial direction with being pressed against each other into a backlash-free condition. Thus, the back-side connecting member 20 is held in a condition where it is inhibited from rotating relative to the cushion-side connecting member 10.

When one of the wedge members 40A, 40B that are pressed toward the opposite sides is pushed and rotated in a direction (e.g., the clockwise direction as viewed in FIG. 9) in which the wedge member is released from the pressed condition, through the operation to rotate the operating member 60 about its axis as will be described later, the back-side connecting member 20 is released from the condition where it is inhibited from rotating relative to the cushion-side connecting member 10. Then, the back-side connecting member 20 is pushed and rotated in the clockwise or counterclockwise direction relative to the cushion-side connecting member 10 with a mesh position where the gears 21, 11 mesh with each other changing in the direction of the rotation.

As shown in FIG. 6, three dowels 23 that protrude in arcuately curved shape are formed on the axially outer surface of the back-side connecting member 20, at the same circumference positions, such that they are arranged in the circumferential direction. The dowels 23 are formed by half-blanking a radially outer portion of the back-side connecting member 20 in the thickness direction. As shown in FIG. 4 and FIG. 7, when the axially outer surface of the back-side connecting member 20 is placed against and joined to the inner surface of the side frame 2F of the seat back 2, the dowels 23 are fitted in and integrally joined by welding to three dowel holes 2Fb (see FIG. 3) formed in the side frame 2F. In the side frame 2F of the seat back 2, a through-hole 2Fa in the form of a precise hole that extends through the thickness of the side frame 2F is further formed in a central portion of a region surrounded by the three dowel holes 2Fb. The rod 5R passes through the through-hole 2Fa in the axial direction. In this embodiment, the side frame 2F of the seat back 2 is one example of a frame, and each dowel hole 2Fb serves as a fitting portion of the frame.

As shown in FIG. 6, in the radially outer portion of the back-side connecting member 20, three recessed portions 24 that are recessed radially inward, and three expanded portions 25 that expand radially outward beyond the recessed portions 24, are formed such that the recessed portions 24 and the expanded portions 25 are arranged alternately in the circumferential direction. The recessed portions 24 are respectively formed in three regions (hereinafter, also referred to as "dowel-gap circumferential regions") at circumferential positions where the three dowels 23 are not formed. The dowel-gap circumferential regions are located between three regions (hereinafter, also referred to as "dowel-formed circumferential regions") at circumferential positions where the dowels 23 are formed. The recessed portions 24 have outer circumferential surfaces as bottoms of recesses, which are located at the same radial position as the outer circumferential surfaces of the three dowels 23.

Each of the expanded portions 25 has, on each of the dowel-formed circumferential regions, a thickness portion that protrudes radially outward beyond the corresponding dowel 23. Also, each expanded portion 25 has such a large circumferential length that it protrudes in circumferentially opposite directions from the corresponding dowel 23 located on the radially inner side of the expanded portion 25. The expanded portions 25 and the recessed portions 24, which constitute a plate region on the radially outer side of the external gear 21 of the back-side connecting member 20, are flush with the plate region and have the same thickness as the plate region.

As will be described later, the ring member 70 has joint portions 71 that are formed at one axial end of the cylindrical ring member 70 so as to protrude in the axial direction from three regions arranged in the circumferential direction. Each of the recessed portions 24 receives the corresponding one of the joint portions 71 in the axial direction. Thus, the joint portion 71 is fitted in the recessed portion 24 in a condition where it is placed on the outer circumferential surface of the recessed portion 24 (the back-side connecting member 20). An axial end portion of each of the joint portions 71 of the ring member 70 fitted in each of the recessed portions 24 is welded onto the outer circumferential surface of the corresponding recessed portion 24 by arc welding, so that the ring member 70 is integrated with the back-side connecting member 20.

When the joint portions 71 of the ring member 70 are inserted into the recessed portions 24 until they reach appropriate positions in the axial direction, recessed portions 71A formed between the joint portions 71 in the circumferential direction are brought into abutting contact with the expanded portions 25 in the axial direction. Thus, the axial positions of the joint portions 71 of the ring member 70 are determined, and the expanded portions 25 serve as butting portions for determining the axial positions of the joint portions 71 inserted in the recessed portions 24. Also, when the dowels 23 are fitted in the dowel holes 2Fb formed in the side frame 2F of the seat back 2, and the axially outer surface of the back-side connecting member 20 is brought into plane contact with the inner surface of the side frame 2F, the expanded portions 25 are placed against the inner surface of the side frame 2F so as to be in plane contact with it. With this arrangement, when a contact region between the outer circumferential surface of each dowel 23 and the inner circumferential wall of the corresponding dowel hole 2Fb of the side frame 2F is subjected to arc welding from the axially outer side of the side frame 2F, the corresponding expanded portion 25 is placed, from the back side, against a weld zone We of the side frame 2F. As a result, the thickness of a weld region to which welding heat is applied is increased, and burn-through of the side frame 2F is less likely or unlikely to occur.

Next, the configuration of the pair of wedge members 40A, 40B will be described. As shown in FIG. 5, the wedge members 40A, 40B are formed in arcuately curved shape to be symmetric to each other, and are placed in the annular clearance S formed between the round hole 12 of the cushion-side connecting member 10 and the cylindrical portion 22 of the back-side connecting member 20 (see FIG. 8). The wedge members 40A, 40B are curved along the shape of the annular clearance S, and tapered such that its thickness in radial directions is reduced from one circumferential end to the other end.

Spring engaging portions 41A, 41B are formed in large-thickness end portions of the wedge members 40A, 40B by partially cutting out these portions, and respective end portions 50A, 50B of the lock spring 50 in the form of an open ring are engaged, from the inside, in the spring engaging portions 41A, 41B. Thus, the wedge members 40A, 40B receive forces in directions in which they are moved away from each other in the circumferential direction, under the bias force of the lock spring 50, so as to be pressed toward the opposite sides in the circumferential direction, from a region having a larger radial clearance to a region having a smaller clearance in the annular clearance S. With the pressing force thus applied, the back-side connecting member 20 is constantly pressed against the cushion-side connecting member 10 (pressing points P1, P2) in a particular radial direction (downward in FIG. 8). In this state, the gears 21, 11 mesh with each other in the particular radial direction with being pressed against each other into a backlash-free condition. Thus, the gears 21, 11 are held in a condition where rotation of the gears 21, 11 is inhibited.

The gears 11, 21 are released from the above-described condition in which the gears 11, 21 (the connecting members 10, 20) are inhibited by the wedge members 40A, 40B from rotating when the operating member 60 pivotally mounted in the cylindrical portion 22 of the back-side connecting member 20 is operated to be rotated about the axis in one direction or the other direction, through the operation to rotate the rod 5R about its axis. Next, the configuration of the operating member 60 will be described. As shown in FIG. 6, the operating member 60 has a generally disk-shaped retainer plate portion 61, a cylindrical portion 62 that protrudes in the axial direction from a central portion of the retainer plate portion 61, and an arcuate operating portion 63 that protrudes on the same side as the cylindrical portion 62 in the axial direction from an outer peripheral portion of the retainer plate portion 61.

A hexagonal hole 60A is formed in a central portion of the operating member 60 such that the hole 60A extends through the cylindrical portion 62 and the retainer plate portion 61 in the axial direction. The rod 5R having a hexagonal shape in cross section is axially fitted in the hexagonal hole 60A and connected to the operating member 60 such that the rod 5R and the operating member 60 can rotate as one unit. The retainer plate portion 61 is formed with a cutout in a circumferential region of its radially outer portion. Respective end faces of the cutout, which face in the direction of rotation, serve as spring pushing portions 61A, 61B that push and move end portions 50A, 50B of the lock spring 50 engaged with the wedge members 40A, 40B (see FIG. 9).

Figure 9:
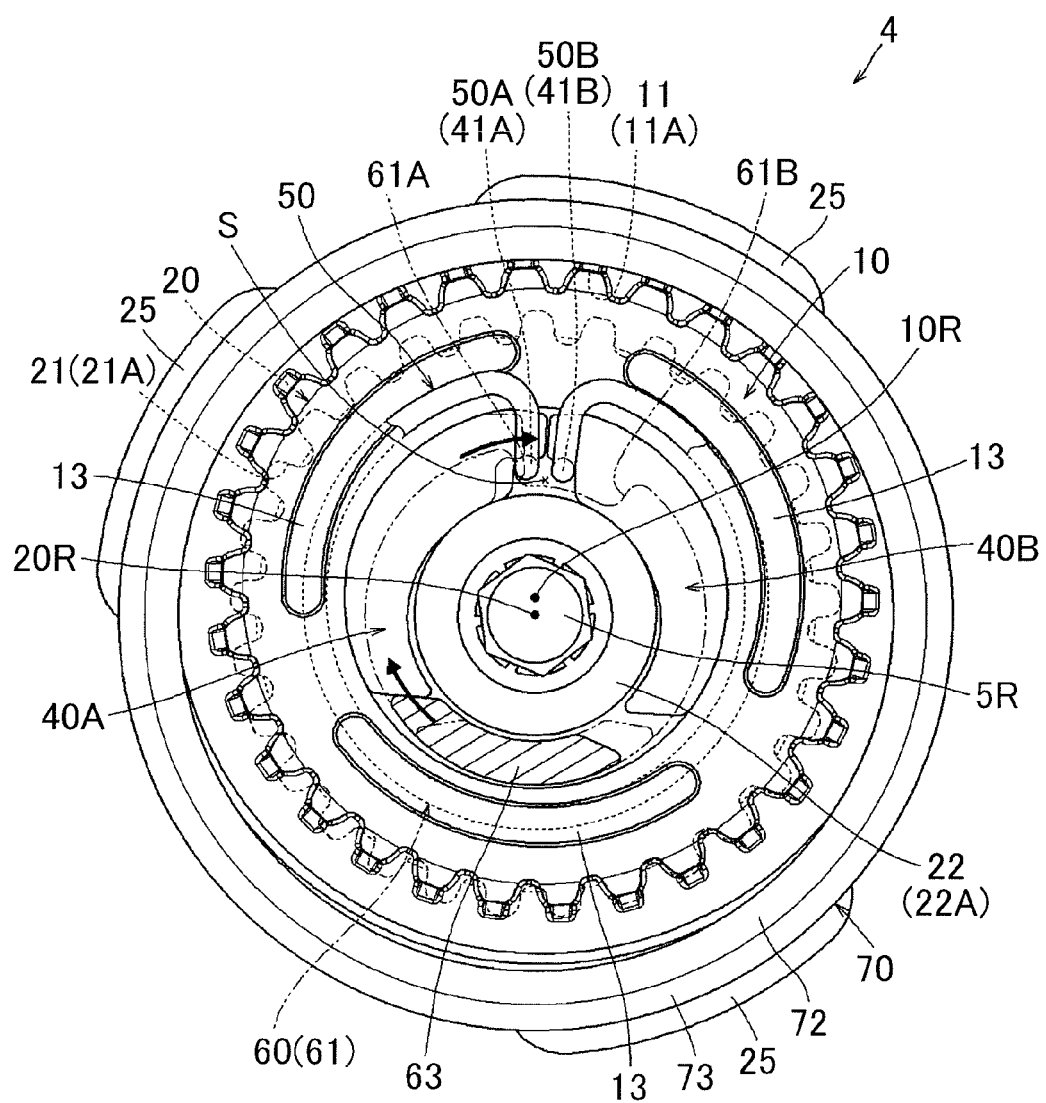
FIG. 9 is a side view showing a condition in which the recliner is rotated to one side.
Figure 10:
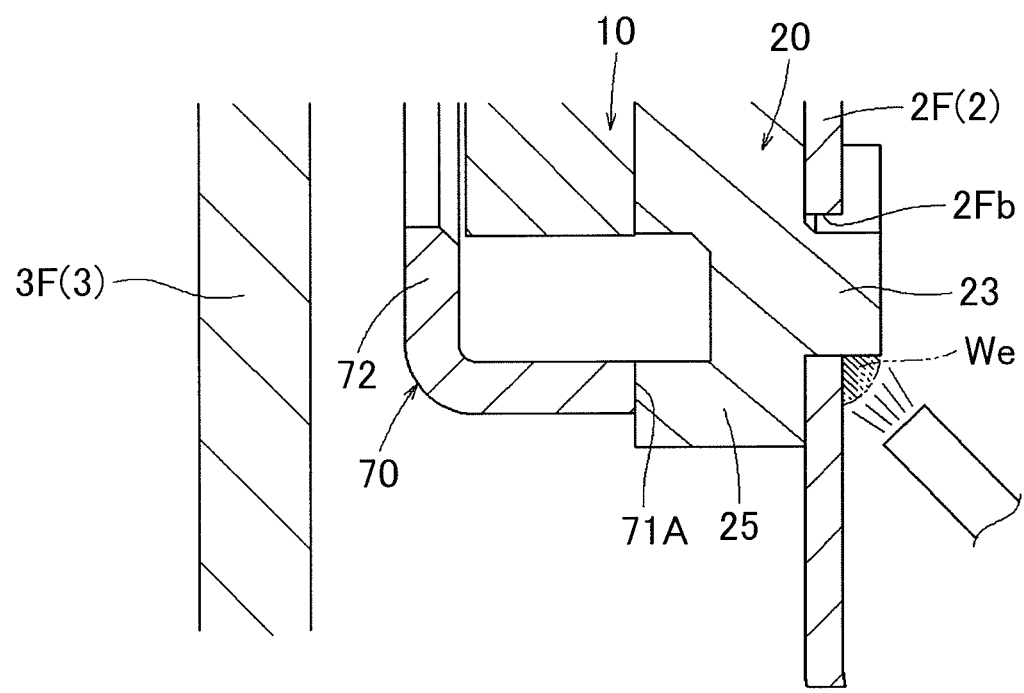
FIG. 10 is an enlarged view of a principal part of FIG. 7, showing the manner of welding the recliner to a side frame of the seat back.

As shown in FIG. 5, FIG. 7 and FIG. 8, the operating member 60 is supported by the back-side connecting member 20 with its cylindrical portion 62 being fitted in the cylindrical portion 22 of the back-side connecting member 20 such that the operating member 60 is rotatable about its axis. Thus, the operating member 60 is set in position such that the operating portion 63 is inserted in a clearance (annular clearance S) between small-thickness end portions of the wedge members 40A, 40B, and the retainer plate portion 61 is placed against the wedge members 40A, 40B from the axially outer side, while the spring pushing portions 61A, 61B are located at positions adjacent to the respective end portions 50A, 50B of the lock spring 50 in the circumferential direction. In FIG. 8-FIG. 9, the retainer plate portion 61 of the operating member 60 and a part of the lock spring 50 are indicated by imaginary lines, for easier understanding of the internal structure of the recliner 4.

The operating member 60 mounted as described above is inserted in the axial direction in the hexagonal hole 60A in the central portion of the operating member 60, and connected to the rod 5R so as to be rotatable as one unit with the rod 5R. When the rod 5R is driven by the drive unit 5 and rotated about its axis in one of the forward and reverse directions, the operating member 60 is rotated about its axis in the same direction. As shown in FIG. 2, the rod 5R is inserted through the hexagonal hole 60A of the operating member 60 from the inside to the outside in the axial direction, and held in a condition in which it is inhibited from being pulled out of the operating member 60 in the axial direction with a retaining washer 5Ra mounted on an axially outer end portion of the rod 5R thus inserted. When the operating member 60 is rotated about its axis in the clockwise direction as shown in FIG. 9, for example, through the operation to rotate the rod 5R about its axis, the operating portion 63 pushes the small-thickness end portion of the left-side wedge member 40A (in FIG. 9) to rotate the wedge member 40A in the clockwise direction (the same direction as the direction of rotation of the operating member 60). At the same time, the left-side spring pushing portion 61A formed in the retainer plate portion 61 pushes the end portion 50A of the lock spring 50 engaged with the left-side wedge member 40A, so as to disengage the lock spring 50 from the wedge member 40A.

Through the above operation, the operating member 60 pushes out the left-side wedge member 40A into a relatively wide region of the annular clearance S from a condition where the wedge member 20A is stuck in a narrow region of the clearance S, and releases the wedge member 40A from the bias force applied from the lock spring 50 to the wedge member 40. Thus, the left-side wedge member 40 is rotated in the clockwise direction. Through this operation, the gears 11, 21 (the connecting members 10, 20) are released from the condition where they are inhibited from rotating by the wedge members 40A, 40B, and the wedge members 40A, 40B are pushed and rotated in the clockwise direction while pushing the narrow region of the annular clearance S. In this manner, the particular radial direction as the direction in which the cylindrical portion 22 of the back-side connecting member 20 is pressed against the round hole 12 of the cushion-side connecting member 10 gradually changes in the clockwise direction (in FIG. 9) from the downward direction, and the mesh position where the external gear 21 meshes with the internal gear 11 is gradually changed in the clockwise direction (in FIG. 9). As a result, the external gear 21 rotates by itself in the clockwise direction relative to the internal gear 11, due to a difference in the number of teeth, and the back-side connecting member 20 (the seat back 2) is tilted forward relative to the cushion-side connecting member 10 (the seat cushion 3).

The above-described tilting of the seat back 2 is stopped when the operation to rotate the rod 5R is stopped and the wedge members 40A, 40B are returned to the condition where they are stuck in the narrow region of the annular clearance S under the bias force of the lock spring 50. When the rod 5R is rotated in the reverse direction that is opposite to the direction described above, the recliner 4 is operated to be rotated in the reverse direction (in which the seat back 2 is tilted backward).

As shown in FIG. 2 and FIG. 3, a cap 80 in the form of a cylindrical container is fitted in and welded to the fitting hole 3Fa of the side frame 3F of the seat cushion 3 to which the recliner 4 is joined. The cap 80 is welded to an outer peripheral portion of the fitting hole 3Fa of the side frame 3F (protrusions formed between the regions where the three dowel holes 3Fb are located). In the recliner 4, the cap 80 has a function of retaining the wedge members 40A, 40B, lock spring 50, and the operating member 60 which are assembled in the axial direction, so that these members 40A, 40B, 50, 60 do not fall off to the outside in the axial direction.

Next, the configuration of the ring member 70 will be described. As shown in FIG. 5 and FIG. 6, the ring member 70 is formed into a generally cylindrical shape as a whole, by stamping a thin steel plate into a hollow disk shape, and drawing or raising its outer peripheral portion in the thickness direction. The ring member 70 is formed with a hollow disk-shaped seat (retaining portion 72) that faces in the axial direction. The seat (retaining portion 72) is placed, from the axially outer side, against the internal gear 11 that constitutes a radially outer portion of the cushion-side connecting member 10.

The ring member 70 has, as the joint portions 71, three pieces that are spaced from each other in the circumferential direction and formed on a distal end portion of a generally cylindrical portion that extends in the axial direction on the side opposite to the side on which the retaining portion 72 is formed. The joint portions 71 are inserted in the axial direction into the recessed portions 24 formed in the radially outer portion of the back-side connecting member 20 a and joined to the recessed portions 24. Between the circumferential regions where the joint portions 71 are located, the recessed portions 71A are formed by cutting from the distal end in the axial direction.

The inside diameter of each of the joint portions 71 is made substantially equal to (or slightly larger than) the outside diameter of each of the recessed portions 24 formed in the radially outer portion of the back-side connecting member 20, so that the joint portions 71 are inserted in the axial direction into the recessed portions 24 and fitted in the recessed portions 24 in a condition where the joint portions 71 are placed against the outer circumferential surfaces of the recessed portions 24. Also, the circumferential length of each of the joint portions 71 is made substantially equal to (or slightly smaller than) that of the corresponding recessed portion 24. After the joint portions 71 are inserted in the axial direction into the recessed portions 24 of the back-side connecting member 20, the joint portions 71 are joined integrally onto the outer circumferential surfaces of the recessed portions 24 by arc welding.

When the joint portions 71 are inserted into the recessed portions 24 until they are appropriately fitted in the recessed portions 24, each of the recessed portions 71A formed between the regions where the joint portions 71 are located is brought into abutting contact with the axially inner surface of each of the expanded portions 25 of the back-side connecting member 20, so that the axial positions of the joint portions 71 thus inserted are determined. With the ring member 70 thus mounted (joined) to the back-side connecting member 20, the retaining portion 72 faces the axially outer surface of the internal gear 11 of the cushion-side connecting member 10, and holds the cushion-side connecting member 10 in a condition where it is rotatable relative to the back-side connecting member 20 without falling off in the axial direction.

In sum, the recliner 4 of this embodiment is constructed as follows. The recliner 4 has the cushion-side connecting member 10 and back-side connecting member 20 (two disk-shaped connecting members) assembled in the axial direction such that they are rotatable relative to each other, the pair of wedge members 40A, 40B and lock spring 50 (rotation inhibiting mechanism) provided between the connecting members 10, 20 to inhibit relative rotation of these members, and the ring member 70 mounted across the radially outer portions of the cushion-side connecting member 10 and back-side connecting member 20 so as to hold these connecting members 10, 20 in the axially assembled condition. The ring member 70 has a retaining portion 72 that is placed, from the outside in the axial direction, against the radially outer portion of the cushion-side connecting member 10 (first connecting member), and the joint portions 71 joined to the radially outer portion of the back-side connecting member 20 (second connecting member). The protruding dowels 23 fitted in the dowel holes 2Fb (fitting portion) of the side frame 2F (frame) of the seat back 2 are formed in circumferential regions of the axially outer surface of the back-side connecting member 20.

The radially outer portion of the back-side connecting member 20 has the expanded portions 25 formed in the dowel-formed circumferential regions and the recessed portions 24 formed in the dowel-gap circumferential regions. The expanded portions 25 are expanded radially outward beyond the dowels 23, and the recessed portions 24 are recessed radially inward relative to the expanded portions 25. The recessed portions 24 receive the joint portions 71 of the ring member 70 in the axial direction, and the joint portions 71 of the ring member 70 are placed against the recessed portions 24 from the radially outer side. The expanded portions 25 expand radially outward beyond the joint portions 71 of the ring member 70 placed against the recessed portions 24, from the radially outer side, and serve as backing portions that are placed from the inside in the axial direction, against the weld zones We of the side frame 2F in which the dowels 23 are welded from the outside in the axial direction.

Thus, the expanded portions 25 that expand on the radially outer side of the dowels 23 are placed, from the back side, against the weld zones We of the side frame 2F in which the dowels 23 of the back-side connecting member 20 are welded, and as a result, the side frame 2F is less likely or unlikely to burn through when the dowels 23 are welded to the side frame 2F. The expanded portions 25 expand radially outward beyond the joint portions 71 of the ring member 70 which are placed, from the radially outer side, on the recessed portions 24 of the back-side connecting member 20; therefore, sufficiently large backing portions for curbing burn-through of the side frame 2F can be ensured.

In the cushion-side connecting member 10, the internal gear 11 is formed by half-blanking on the axially outer side of a central portion of the disk shape. In the back-side connecting member 20, the external gear 21 is formed by half-blanking on the axially inner side of a central portion of the disk shape, and the dowels 23 are formed on regions on the radially outer side of the external gear 21. The external gear 21 and the internal gear 11 mesh with each other such that the external gear 21 is rotatable relative to the internal gear 11 while changing the mesh position. With this arrangement, the back-side connecting member 20 can be joined with high strength to the side frame 2F of the seat back 2. Namely, the back-side connecting member 20 formed with the external gear 21 has a region that protrudes axially outward on the radially outer side of the external gear 21. With the dowels 23 formed in this region, the amount of protrusion of the dowels 23 in the axial direction is reduced, and the dowels 23 are located in a region close to the outer periphery of the back-side connecting member 20. Thus, the back-side connecting member 20 can be constructed with high structural strength. In this arrangement, the backing portions (expanded portions 25) placed against the weld zones We of the side frame 2F of the seat back 2 are provided, so burn-through of the weld zones We of the side frame 2F can be more appropriately curbed.

The expanded portions 25 also serve as butting portions against which the ring member 70 is butted in the axial direction such that the mounting position of the ring member 70 is determined. Thus, the expanded portions 25 against which the ring member 70 is butted in the axial direction determines the mounting position of the ring member 70; therefore, a separate positioning structure is not needed, and the configuration can be simplified.

While one embodiment of the invention has been described, the invention may be embodied in various forms other than the above-described embodiment. For example, the recliner of this invention may be widely applied to seats for vehicles, such as railroad vehicles, other than automobiles, and other vehicles, such as airplanes and ships. The base to which the seat back is connected may be a bracket provided on the floor, other than the seat cushion provided on the floor.

The recliner may have other configurations for connecting the seat back to the base on the floor, such that the backrest angle is adjustable. The recliner may be a manual stepless recliner, other than the electric stepless recliner as illustrated in the above embodiment. Also, the recliner may be a plural-step recliner in which rotation is inhibited or permitted through operation to lock or unlock teeth, as disclosed in Japanese Patent Application Publication No. 2011-116303 (JP 2011-116303 A). More specifically, the recliner has two disk-shaped ratchet (as one of the first connecting member and the second connecting member) and guide (as the other of the first connecting member and first connecting member) assembled in a condition where they can rotate relative to each other, pawls (rotation inhibiting mechanism), and a ring member. The pawls are supported by the guide in the circumferential direction. The pawls are being moved and pushed radially outward to mesh with the ratchet, and as a result, rotational movement of the ratchet relative to the guide is inhibited. The ring member is mounted across radially outer portions of the ratchet and the guide, and holds theses members in the axially assembled condition.

In the above-described embodiment, the first connecting member (cushion-side connecting member 10) is formed with the internal gear, and the second connecting member (back-side connecting member) is formed with the external gear. However, the first connecting member may be formed with the external gear, and the second connecting member may be formed with the internal gear. Namely, the second connecting member on which the expanded portions are formed is only required to be formed as a member to which the ring member is integrally joined.

The joint portions of the ring member may be integrally joined to the radially outer portion of the second connecting member by press fitting or caulking. Also, the radially outer portion of the second connecting member to which the joint portions of the ring member are joined may be one of side surfaces that face in the axial direction, other than the outer circumferential surface of the second connecting member.

The expanded portions may have other configurations for protruding radially outward so as to be placed, from the back side, against the weld zones of the frame to which the dowels are welded, on the dowel-formed circumferential regions in the radially outer portion of the second connecting member, and the shape and size of the expanded portions are not limited to any particular shape and size. However, the expanded portion may have a circumferential length or a radial expansion length large enough to cover at least the region in which the dowel is welded to the frame, and the axial thickness of the expanded portion may be large enough to appropriately curb burn-through of the frame.

What is claimed is:

1. A recliner that connects a seat back to a base on a floor such that a backrest angle of the seat back is adjustable, the recliner comprising:
   a first disk shaped connecting member and a second disk shaped connecting member assembled in an axial direction such that the first connecting member and the second connecting member are rotatable relative to each other;
   a rotation inhibiting mechanism that is provided between the first connecting member and the second connecting member and inhibits relative rotation of the first connecting member and the second connecting member; and
   a ring member that is mounted across radially outer portions of the first connecting member and the second connecting member and holds the first connecting member and the second connecting member assembled in the axial direction, wherein the ring member has a retaining portion placed against the radially outer portion of the first connecting member, from an outside in the axial direction, and a joint portion joined to the radially outer portion of the second connecting member;
   a dowel fitted in a fitting portion of a frame that constitutes one of the seat back and the base is provided in a region of an axially outer surface of the second connecting member, the dowel protruding from the axially outer surface;
   the radially outer portion of the second connecting member has an expanded portion that expands radially outward beyond the dowel in a region at a circumferential position where the dowel is provided, and has a recessed portion that is recessed radially inward relative to the expanded portion in a region at a circumferential position where the dowel is not provided;
   the recessed portion receives the joint portion of the ring member in the axial direction, and the joint portion of the ring member is placed on an outer circumferential surface of the recessed portion; and
   the expanded portion expands radially outward beyond the joint portion of the ring member placed on the outer circumferential surface of the recessed portion, and is placed, from an inside in the axial direction, against a weld zone of the frame in which the dowel fitted in the fitting portion is welded from the outside in the axial direction.

2. The recliner according to claim 1, wherein:
   the first connecting member has an internal gear formed by half-blanking on an axially outer side of a central portion of the first connecting member;
   the second connecting member has an external gear formed by half-blanking on an axially inner side of a central portion of the second connecting member;
   the external gear meshes with the internal gear and rotates relative to the internal gear while changing a mesh position where the external gear meshes with the internal gear; and
   the dowel is provided in the region located on a radially outer side of the external gear.

3. The recliner according to claim 1, wherein the expanded portion determines a mounting position of the ring member when the ring member is butted against the expanded portion in the axial direction.

* * * * *